United States Patent
Elkow

(10) Patent No.: US 6,615,888 B2
(45) Date of Patent: Sep. 9, 2003

(54) VARIABLE-DIAMETER WHEEL-AND-TIRE APPARATUS FOR MOTOR VEHICLES

(76) Inventor: Douglas B. Elkow, 329 Hedley Way, Edmonton, Alberta (CA), T6R 1V1

(*) Notice: Subject to any disclaimer, the term of this patent is extended or adjusted under 35 U.S.C. 154(b) by 0 days.

(21) Appl. No.: 10/189,485

(22) Filed: Jul. 8, 2002

(65) Prior Publication Data

US 2003/0071513 A1 Apr. 17, 2003

Related U.S. Application Data

(63) Continuation-in-part of application No. 09/976,268, filed on Oct. 15, 2001.

(51) Int. Cl.⁷ ............................ B60C 19/00; B60C 5/00; B60C 7/24; B60C 23/10; B60C 5/18
(52) U.S. Cl. ................. 152/342.1; 152/376; 152/415; 152/344.1; 152/339.1; 152/418
(58) Field of Search ................. 301/13.1, 13.2, 301/36.1, 40.1, 40.2, 40.6; 152/415, 416, 418, 419, 331.1, 339.1, 340.1, 341.1, 342.1 I, 376, 343.1, 344.1, 345.1

(56) References Cited

U.S. PATENT DOCUMENTS

| | | | | |
|---|---|---|---|---|
| 1,335,711 A | * | 3/1920 | Jakovleff | 152/58 |
| 1,679,444 A | * | 8/1928 | Pagenhart | 152/341.1 |
| 2,127,075 A | * | 8/1938 | Venosta | 152/342.1 |
| 2,201,632 A | * | 5/1940 | Roessel | 152/220 |
| 2,241,849 A | * | 5/1941 | Fuchs | 301/47 |
| 2,254,318 A | * | 9/1941 | Roessel | 301/47 |
| 2,445,503 A | * | 7/1948 | Williams | 152/339.1 |
| 2,641,295 A | * | 6/1953 | des Rosiers | 152/339.1 |
| 2,664,935 A | * | 1/1954 | des Rosiers | 152/339.1 |
| 2,751,959 A | * | 6/1956 | Blomquist | 152/416 |
| 2,765,199 A | * | 10/1956 | Partin | 301/47 |
| 4,765,383 A | * | 8/1988 | Bott | 152/209.1 |
| 5,505,080 A | * | 4/1996 | McGhee | 73/146.5 |
| 5,611,875 A | * | 3/1997 | Bachhuber | 152/415 |
| 5,629,874 A | * | 5/1997 | Mittal | 702/140 |
| 5,647,927 A | * | 7/1997 | Mason | 152/415 |
| 5,788,335 A | * | 8/1998 | O'Brien | 301/45 |
| 5,810,451 A | * | 9/1998 | O'Brien | 301/45 |
| 5,839,795 A | * | 11/1998 | Matsuda et al. | 301/5.1 |
| 5,928,444 A | * | 7/1999 | Loewe et al. | 152/418 |
| 6,022,082 A | * | 2/2000 | O'Brien | 301/45 |
| 6,044,883 A | * | 4/2000 | Noyes | 152/210 |
| 6,357,502 B1 | * | 3/2002 | Caretta | 152/454 |
| 6,470,935 B1 | * | 10/2002 | Fulsang | 152/339.1 |

FOREIGN PATENT DOCUMENTS

| | | |
|---|---|---|
| DE | 198 58 478 A1 | 6/2000 |
| JP | 07 156602 A1 | 6/1995 |

\* cited by examiner

*Primary Examiner*—S. Joseph Morano
*Assistant Examiner*—Jason R. Bellinger
(74) *Attorney, Agent, or Firm*—Miller Thomson LLP

(57) ABSTRACT

A wheel-and-tire apparatus has a pneumatic tire with two or more circumferential tread sections, the relative diameters of which may be adjusted to select the tread sections in contact with the road. The tire may have one or more air chambers. The apparatus facilitates selective use of tire tread designs and compositions having different performance characteristics to suit particular road conditions and vehicle operating parameters. Adjustment of tread section diameters is accomplished using tread diameter adjustment means having a source of compressed air. Sensors monitor selected operational parameters of the vehicle and transmit corresponding signals to a computer, which selects an optimal configuration of tread section diameters to suit the data from the sensors. The computer sends a corresponding signal instructing the tread diameter adjustment means to adjust the diameter of one or more tread sections as required to achieve the selected configuration of tread section diameters.

29 Claims, 4 Drawing Sheets

VARIABLE-DIAMETER WHEEL-AND-TIRE APPARATUS FOR MOTOR VEHICLES

Figure 1:
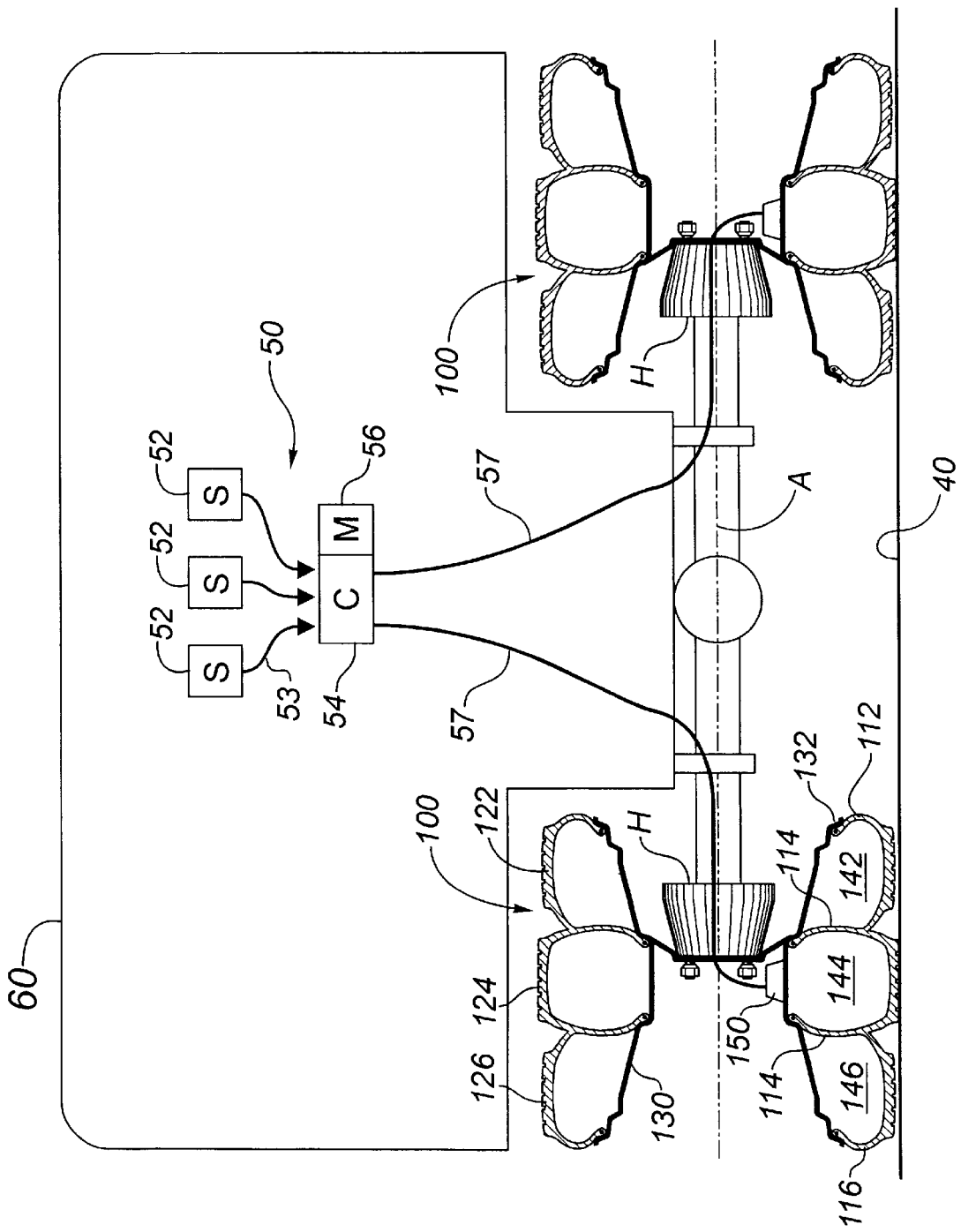
Figure 2A:
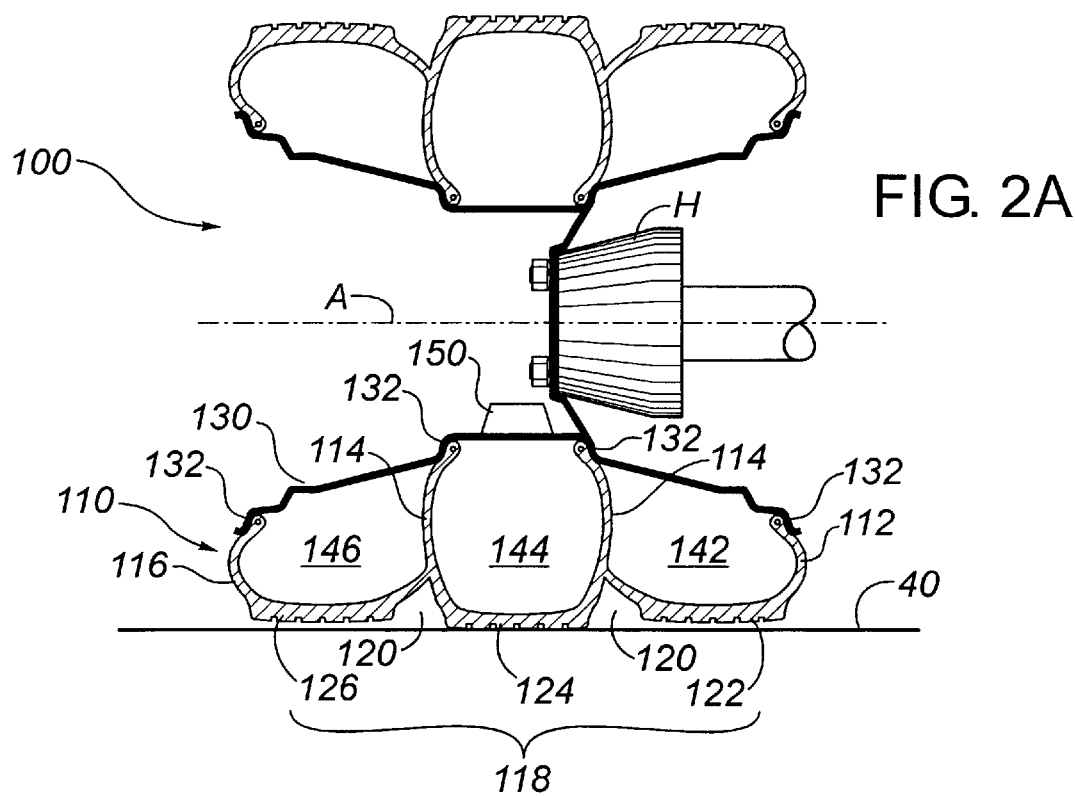
Figure 2B:
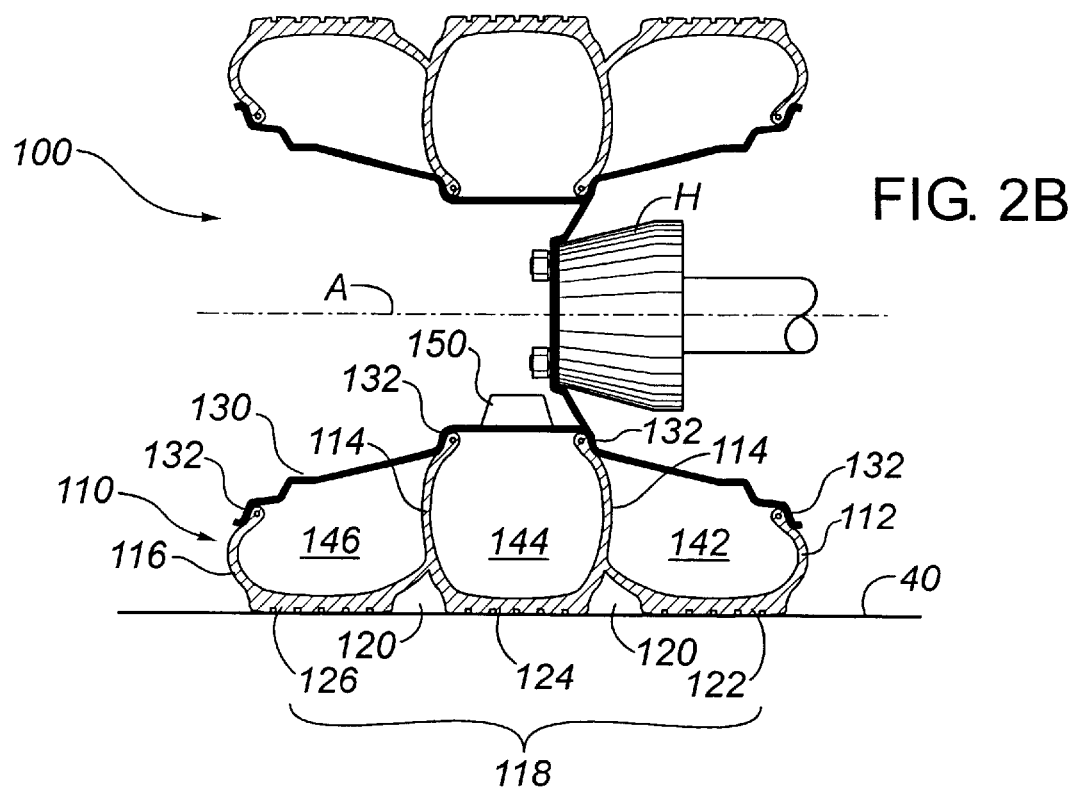
Figure 3A:
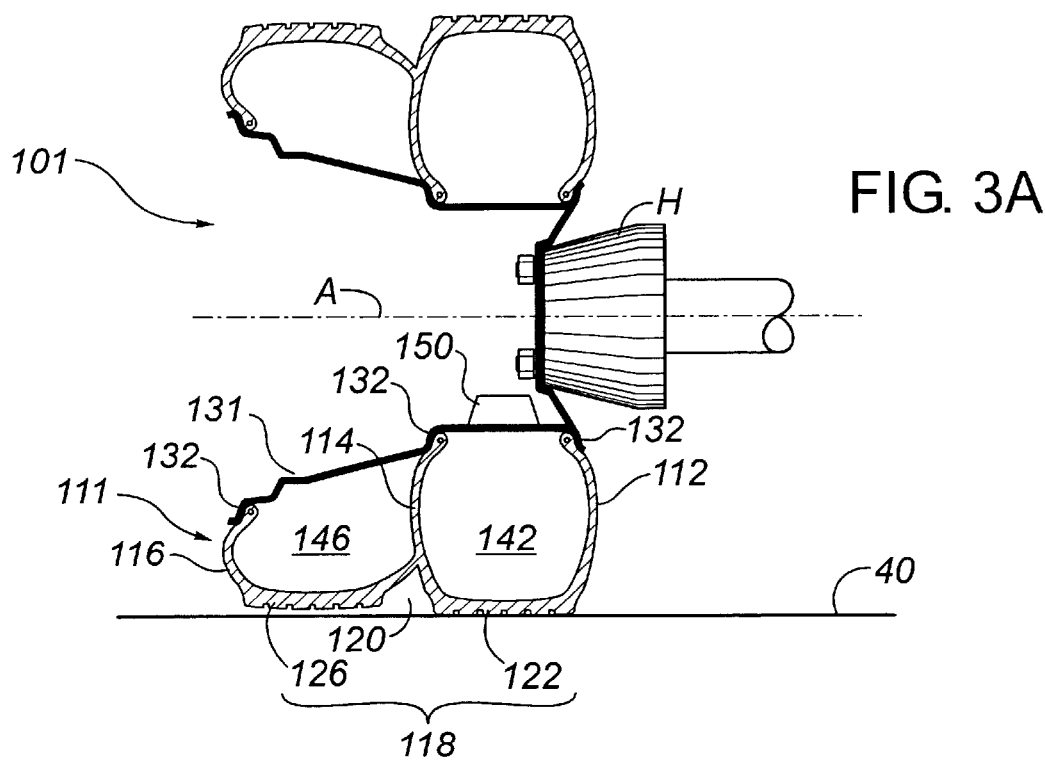
Figure 3B:
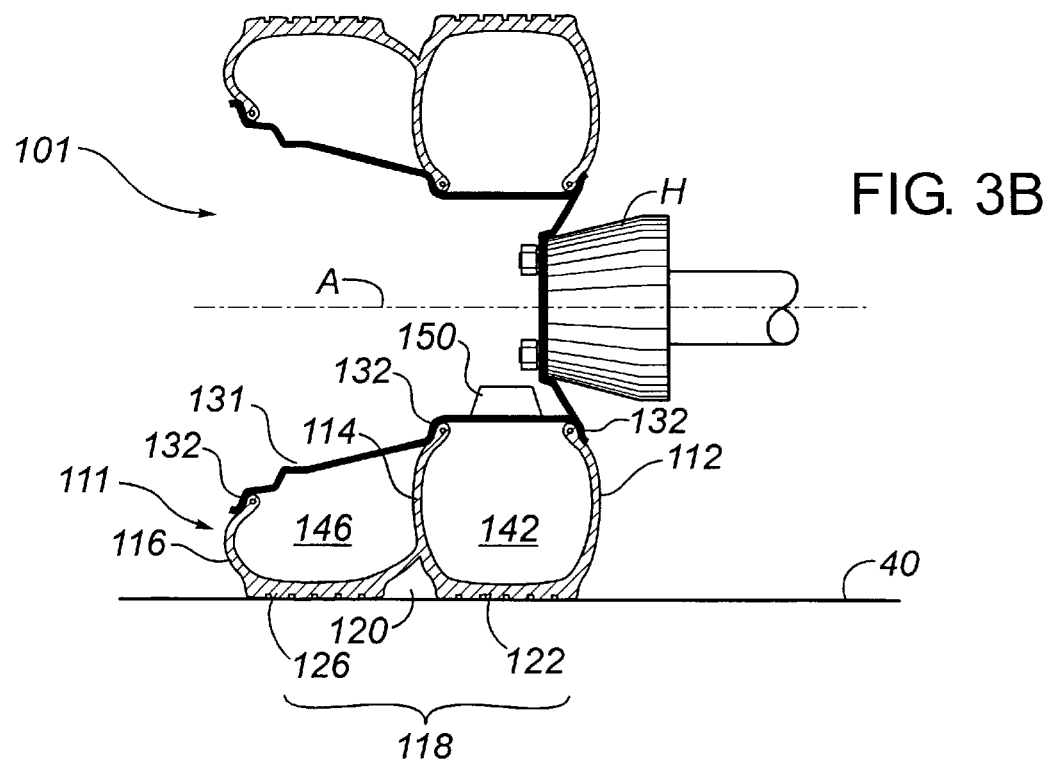
Figure 4A:
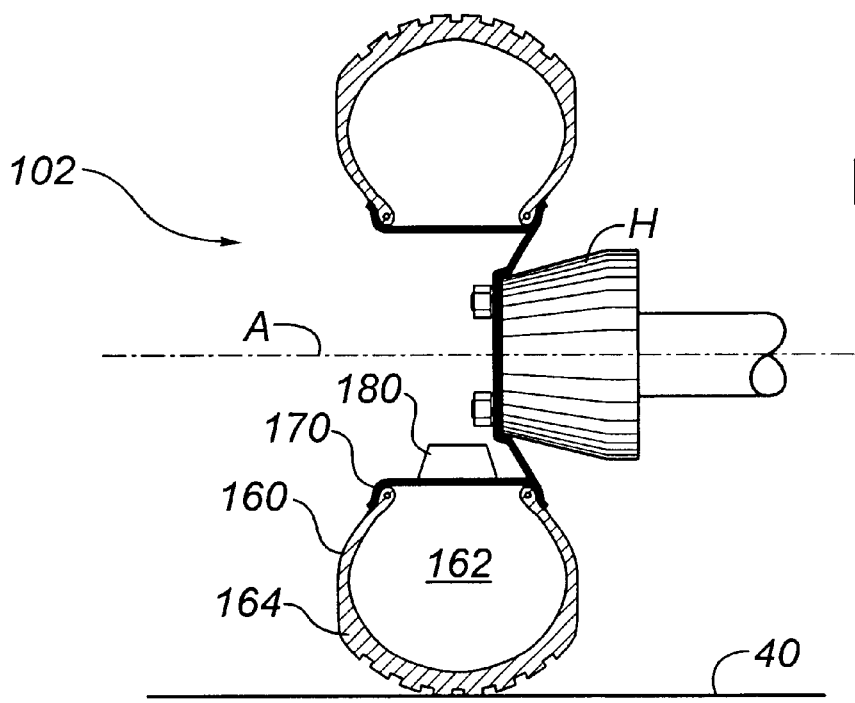
Figure 4B:
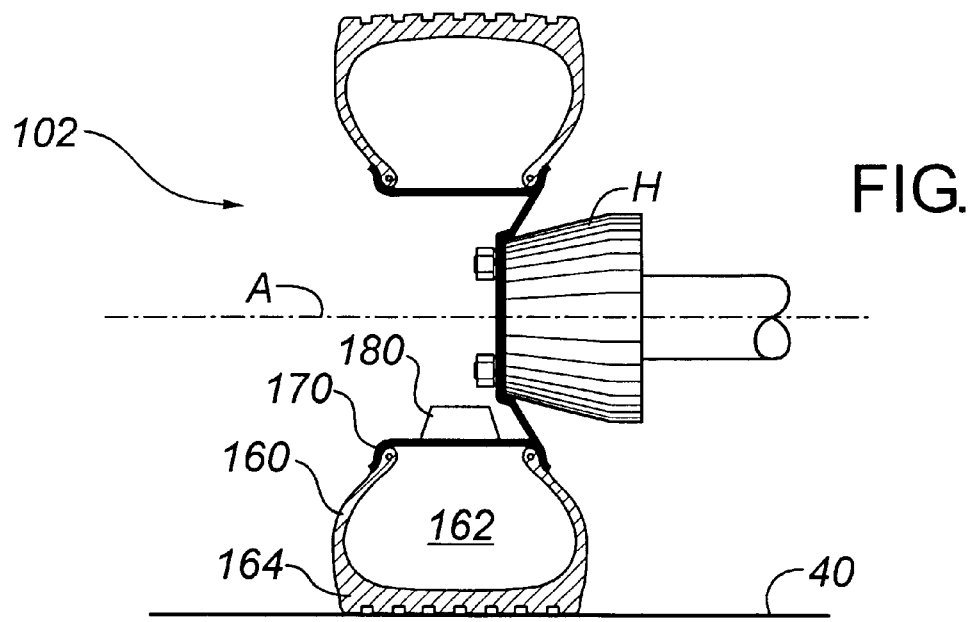

This application is a continuation of application Ser. No. 09/976,268 filed Oct. 15, 2001.

BRIEF SUMMARY OF THE INVENTION

In general terms, the present invention is a wheel-and-tire apparatus including a pneumatic tire mounted on a wheel rim, for mounting on a motor vehicle in place of a conventional single-tire or dual-tire assembly. The pneumatic tire of the invention has two or more circumferential tread sections which may have different tread patterns if desired, or may incorporate different materials having different physical properties. The invention also includes means for selectively varying the diameter of the tread sections such that the number of tread sections in contact with the road surface varies as well. The invention thus facilitates the selective use of tire tread designs and material compositions having different performance characteristics, as may be desired or preferred to suit particular road conditions or vehicle operating conditions.

Although the tread section diameter adjustment may be controlled manually, the present invention also provides for automatic tread diameter adjustment through use of sensors which are mounted in the vehicle and which sense one or more selected operational parameters (e.g., speed, acceleration, steering input, braking input, or other parameters capable of being monitored by sensors known in the art). The sensors transmit corresponding signals to a computer which, using a program stored in a memory in the computer, selects an optimal configuration of tread section diameters to suit the particular combination of operational parameters received from the sensors. The computer then transmits a corresponding signal instructing the tread diameter adjustment means to adjust the diameter of one or more tread sections in the assembly as required to achieve the selected configuration of tread section diameters.

Accordingly, in one aspect the invention is a computer-controlled variable-diameter the apparatus for use in association with a motor vehicle. In the preferred embodiment, the apparatus includes a pneumatic tire having an inboard sidewall and an outboard sidewall, plus two internal walls dividing the interior of the tire into an inboard air chamber, an outboard air chamber, and a central air chamber. The tire is mounted on a wheel rim that may be mounted on the wheel hub of the vehicle. The tire has a circumferential tread band extending between the sidewalls, and the tread band has two circumferential tread channels dividing the tread band into an inboard tread section, an outboard tread section, and a central tread section. Each internal wall is generally aligned with one of the tread channels.

The invention also features tread diameter adjustment means, for inflating or deflating a designated one of the air chambers while the tire is at rest or when it is rotating. The tread diameter adjustment means includes an actuator, a computer with a memory, and one or more sensors adapted to measure one or more selected vehicle operational parameters, such as vehicle speed, acceleration, engine speed, braking load, steering input, steering load, engaged transmission gear, tire pressure, tire temperature, and shock absorber load. Each sensor has a sensor communication link for conveying sensor signals to the computer, corresponding to measurements made by the sensor. Also provided is an actuator communication link, for conveying actuation signals from the computer to the actuator.

In accordance with the invention, the computer memory is programmed to store a tread configuration protocol comprising selected tread configurations corresponding to selected sensor signals or combinations of sensor signals. The computer is adapted and programmed to receive a sensor signal or signals via the sensor communication link or links, to select from the tread configuration protocol a tread configuration corresponding to the received sensor signal or combination of sensor signals, and to transmit a corresponding actuation signal to the actuator, via the actuator communication link. The actuator is adapted to actuate the tread diameter adjustment means, in response to and in accordance with an actuation signal from the computer, so as to inflate or deflate the designated air chamber as necessary to render the diameter of a selected tread section or plurality of tread sections larger than the diameter of the non-selected tread section or sections, so as to deploy the selected tread section or sections in operatively-effective contact with the road surface, in accordance with the selected tread configuration.

The tread configurations contained in the tread configuration protocol may include configurations wherein only the central tread section is in operatively-effective contact with the road surface, only the inboard tread section and the outboard tread section are in operatively-effective contact with the road surface, and all three tread sections are in operatively-effective contact with the road surface. In these embodiments, the designated air chamber may be the central air chamber. Alternatively, the designated air chamber could be the inboard air chamber, with the tread diameter adjustment means being further adapted to selectively inflate or deflate both the inboard air chamber and the outboard air chamber, so as to selectively inflate or deflate both the inboard and outboard air chambers as necessary to selectively deploy all three tread sections, only the inboard and outboard tread sections, or only the central tread section, in operatively-effective contact with the road surface, in accordance with the selected tread configuration.

In a further alternative embodiment, the tread diameter adjustment means may be adapted to selectively inflate or deflate any one or more of the air chambers, so as to selectively inflate or deflate the central air chamber and/or both the inboard and outboard air chambers as necessary to selectively deploy all three tread sections, only the inboard and outboard tread sections, or only the central tread section, in operatively-effective contact with the road surface, in accordance with the selected tread configuration.

In the preferred embodiment, the tread diameter adjustment means includes at least one pneumatic pump. For example, in embodiments where the designated air chamber is the central air chamber, a single pump may be provided, with an air outlet in fluid communication with the central air chamber, and with the capability of pumping compressed air into, or exhausting air out of, the central air chamber, as may be desired. Alternatively, additional pumps may be provided in association with either or both of the inboard and outboard air chambers.

The pump may be mounted in association with the wheel rim, and may be actuated by power generated by rotation of the pump with the wheel rim. Alternatively, the pneumatic pump may be battery-powered.

In an alternative embodiment, the tread diameter adjustment means includes a compressed air storage tank mounted in a convenient location within the vehicle. Compressed air lines connect the compressed air tank to one or more of the air chambers of the tire, as may be desired, using swivel-type fittings well known in the art for maintaining the connection of the air lines to the air chambers despite rotation of the tire-and-wheel assembly.

An alternative embodiment is similar to the preferred embodiment described above, except that the tire has only one tread channel and one internal wall, and, accordingly, only inboard and outboard tread sections, and only inboard and outboard air chambers. In this embodiment, the apparatus may be selectively configured such that the diameter of the inboard tread section is either greater than or substantially equally to the diameter of the outboard tread section. Alternatively, the apparatus may be selectively configured such that the diameter of the inboard tread section is smaller than the diameter of the outboard tread section. In a further alternative embodiment, the apparatus may be selectively configured such that the diameter of the inboard tread section is either smaller than, greater than, or substantially equally to the diameter of the outboard tread section.

In any of these embodiments, the various possible configurations of the apparatus may be accomplished by varying the diameter of the inboard tread section only, by varying the diameter of the outboard tread section only, or by varying the diameter of both the inboard outboard tread sections. Operation of the tread diameter adjustment means may be effected in essentially the same way as described previously herein for the preferred embodiment, with modifications in obviously required to suite the two-tread-section embodiment of the apparatus.

In any of the embodiments described above, the actuator communication link may be either a wired or wireless connection, and where it is a wireless connection, the apparatus of the invention will include means for the computer to transmit and for the actuator to receive wireless actuation signals. The sensor communication link may be either wired or wireless connections. Where one of the sensor communication links is a wireless connection, the corresponding sensor will have associated means for transmitting wireless signals, and the computer will have associated means for receiving wireless sensor signals.

In another aspect, the present invention is a manually-controlled variable-diameter tire apparatus for use in association with a motor vehicle. Similar to the embodiments described previously, the manually-controlled apparatus includes a pneumatic tire having an inboard sidewall and an outboard sidewall, one or two internal walls dividing the interior of the tire into an inboard air chamber and an outboard air chamber (and a central air chamber, where there are two internal walls), a circumferential tread band extending between the sidewalls, with the tread band having one or two circumferential tread channels dividing the tread band into an inboard tread section and an outboard tread section (and a central tread section, where there are two tread channels), and with each internal wall being generally aligned with one of the tread channels.

The manually-controlled apparatus also includes tread diameter adjustment means and an associated actuator, a control switch comprising a user interface and a memory, and an actuator communication link, for conveying actuation signals from the control switch to the actuator. The memory is programmed to store a selection of tread configurations. The user interface may be activated to select one of the tread configurations stored in the memory, and the control switch is adapted to generate and transmit to the actuator, via the actuator communication link, an actuation signal corresponding to the selected tread configuration. The actuator is adapted to actuate the tread diameter adjustment means, in response to and in accordance with an actuation signal from the control switch, so as to inflate or deflate the designated air chamber as necessary to deploy a selected one of the tread sections, or a selected plurality of the tread sections, in operatively-effective contact with the road surface, in accordance with the selected tread configuration.

In the preferred embodiment of the manually-controlled apparatus, the tread diameter adjustment means includes at least one pneumatic pump, which may be mounted in association with the wheel rim, and may be actuated by power generated by rotation of the pump with the wheel rim. Alternatively, the pneumatic pump may be battery-powered.

In an alternative embodiment, the tread diameter adjustment means includes a compressed air storage tank mounted in a convenient location within the vehicle. Compressed air lines connect the compressed air tank to one or more of the air chambers of the tire, as may be desired, using swivel-type fittings well known in the art for maintaining the connection of the air lines to the air chambers despite rotation of the tire-and-wheel assembly.

The embodiments of the invention in which an exclusive property or privilege is claimed are defined as follows:

1. A variable-diameter tire apparatus for use in association with a motor vehicle, said apparatus comprising:
   (a) a pneumatic tire having:
      a.1 an inboard sidewall and an outboard sidewall, each having a circular outer edge and a circular opening defining an inner edge;
      a.2 a circumferential tread band disposed between and sealingly interconnecting the outer edges of the sidewalls, said tread band having an exterior surface and an interior surface, said exterior surface having two circumferential tread channels dividing the tread band into an inboard tread section, a central tread section, and an outboard tread section; and
      a.3 two spaced internal walls, each internal wall being generally aligned with one of the tread channels, and each having a circular outer edge sealingly connected to the interior surface of the tread section, and a circular opening defining an inner edge; and
   (b) a wheel rim defining four annular shoulders corresponding to the inner edges of the sidewalls and internal walls, said wheel rim being mountable on a wheel hub of the vehicle;
said pneumatic tire being coaxially mounted on the wheel rim such that the sidewalls, internal walls, and tread sections defined an inboard air chamber, a central air chamber, and an outboard air chamber, and such that each said inner edge will be urged into sealing contact with a corresponding shoulder upon inflation of the air chamber; and said wheel-and-tire apparatus further comprising:
   (c) tread diameter adjustment means, adapted to selectively introduce compressed air into, or to exhaust air out of, a designated air chamber selected from said inboard, central, and outboard air chambers, while the tire is rotating;
   (d) an actuator associated with the tread diameter adjustment means;
   (e) a computer having a memory;
   (f) one or more sensors, each sensor being adapted to measure a selected operational parameter of the vehicle, and each sensor having a sensor communication link for conveying sensor signals, corresponding to measurements made by the sensor, from the sensor to the computer; and
   (g) an actuator communication link for conveying actuation signals from the computer to the actuator;

wherein:
 (h) a tread configuration protocol is stored in the computer memory, said protocol comprising selected tread configurations corresponding to selected sensor signals or combinations of sensor signals;
 (i) the computer is adapted and programmed;
  i.1 to receive a sensor signal or signals via the sensor communication link or links;
  i.2 having reference to the tread configuration protocol, to select a tread configuration corresponding to the received sensor signal or combination of sensor signals; and
  i.3 to transmit a corresponding actuation signal to the actuator, via the actuator communication link; and
 (j) the actuator is adapted to actuate the tread diameter adjustment means, in response to and in accordance with an actuation signal from the computer, so as to inflate or deflate the designated air chamber as necessary to deploy a selected one of the tread sections, or a selected plurality of the tread sections, in operatively-effective contact with the road surface, in accordance with the selected tread configuration.

2. The apparatus of claim 1, wherein the operational parameter measured by each sensor is selected from the group consisting of vehicle speed, acceleration, engine speed, braking load, steering input, steering load, engaged transmission gear, tire pressure, tire temperature, and shock absorber load.

3. The apparatus of claim 1, wherein the tread configuration contained in the tread configuration protocol include the configurations wherein:
 (a) only the central tread section is in operatively-effective contact with the road surface;
 (b) only the inboard tread section and the outboard tread section are in operatively-effective contact with the road surface; and
 (c) all three tread sections are in operatively-effective contact with the road surface.

4. The apparatus of claim 3, wherein the designated air chamber is the central air chamber.

5. The apparatus of claim 3, wherein the designated air chamber is the inboard air chamber, and wherein the tread diameter adjustment means is further adapted to selectively introduce compressed air into, or to exhaust air out of, both the inboard air chamber and the outboard air chamber, while the tire is rotating, so as to selectively inflate or deflate both the inboard and outboard air chambers as necessary to selectively deploy all three tread sections, only the inboard and outboard tread sections, or only the central tread section, in operatively-effective contact with the road surface, in accordance with the selected tread configuration.

6. The apparatus of claim 5, wherein:
 (a) the tread diameter adjustment means is further adapted to selectively introduce compressed air into, or to exhaust air out of, the central air chamber, while the tire is rotating; and
 (b) the actuator is further adapted to actuate the tread diameter adjustment means, in response to and in accordance with an actuation signal from the computer, so as to selectively inflate or deflate the central air chamber and/or both the inboard and outboard air chambers as necessary to selectively deploy all three tread sections, only the inboard and outboard tread sections, or only the central tread section, in operatively-effective contact with the road surface, in accordance with the selected tread configuration.

7. The apparatus of claim 1, wherein:
 (a) the computer further comprises means for transmitting wireless signals;
 (b) the actuator further comprises means for receiving wireless signals; and
 (c) the actuator communication link is a wireless connection.

8. The apparatus of claim 1, wherein:
 (a) at least one of the sensors further comprises means for transmitting wireless signals;
 (b) the computer further comprises means for receiving wireless sensor signals; and
 (c) each sensor communication link associated with a sensor comprising wireless signal transmitting means is a wireless connection.

9. The apparatus of claim 1, wherein the tread diameter adjustment means includes a pneumatic pump in fluid communication with the designated air chamber.

10. The apparatus of claim 9, wherein the pneumatic pump is mounted in association with the wheel rim, and is actuated by power generated by rotation of the pump with the wheel rim.

11. The apparatus of claim 9, wherein the pneumatic pump is battery-powered.

12. The apparatus of claim 1, wherein the tread diameter adjustment means comprises a compressed air storage tank, and a conduit for delivery of compressed air from the storage tank to the designated air chamber.

13. A variable-diameter tire apparatus for use in association with a motor vehicle, said apparatus comprising:
 (a) a pneumatic tire having:
  a.1 an inboard sidewall and an outboard sidewall, each having a circular outer edge and a circular opening defining an inner edge;
  a.2 a circumferential tread band disposed between and sealingly interconnecting the outer edges of the sidewalls, said tread band having an exterior surface and an interior surface, said exterior surface having a circumferential tread channel dividing the tread band into an inboard tread section and an outboard tread section; and
  a.3 an internal wall generally aligned with the tread channel, and having a circular outer edge sealingly connected to the interior surface of the tread section, and a circular opening defining an inner edge; and
 (b) a wheel rim defining three annular shoulders corresponding to the inner edges of the sidewalls and the internal wall, said wheel rim being mountable on a wheel hub of the vehicle;
said pneumatic tire being coaxially mountable on the wheel rim such that the sidewalls, internal walls, and tread sections define an inboard air chamber and an outboard air chamber, and such that each said inner edge will be urged into sealing contact with a corresponding shoulder upon inflation of the air chambers; and said apparatus further comprising:
 (c) tread diameter adjustment means, adapted to selectively introduce compressed air into, or to exhaust air out of, a designated air chamber selected from said inboard and outboard air chambers, while the tire is rotating;
 (d) an actuator associated with the tread diameter adjustment means;
 (e) a computer having a memory;
 (f) one or more sensors, each sensor being adapted to be able to measure a selected operational parameter of the vehicle, and each sensor having a sensor communication link for conveying sensor signals, corresponding to measurements made by the sensor, from the sensor to the computer; and (g) an actuator communication link, for conveying actuation signals from the computer to the actuator;

wherein:

(h) a tread configuration protocol is stored in the computer memory, said protocol comprising selected tread configurations corresponding to selected sensor signals or combinations of sensor signals;

(i) the computer is adapted and programmed:
   i.1 to receive a sensor signal or signals via the sensor communication link or links;
   i.2 having reference to the tread configuration protocol, to select a tread configuration corresponding to the received sensor signal or combination of sensor signals; and
   i.3 to transmit a corresponding actuation signal to the actuator, via the actuator communication link; and (j) the actuator is adapted to actuate the tread diameter adjustment means, in response to and in accordance with an actuation signal from the computer, so as to inflate or deflate the designated air chamber as necessary to deploy a selected one of the tread sections, or a selected plurality of the tread sections, in operatively-effective contact with the road surface, in accordance with the selected tread configuration.

14. The apparatus of claim 13, wherein the operational parameter measured by each sensor is selected from the group consisting of vehicle speed, acceleration, engine speed, braking load, steering input, steering load, engaged transmission gear, tire pressure, tire temperature, and shock absorber load.

15. The apparatus of claim 13, wherein the tread configurations contained in the tire configuration protocol include the configurations wherein:
   (a) only the inboard tread section is in operatively-effective contact with the road surface;
   (b) only the outboard tread section is in operatively-effective contact with the road surface; and
   (c) both tread sections are in operatively-effective contact with the road surface.

16. The apparatus of claim 15, wherein:
   (a) the tread diameter adjustment means is further adapted to selectively introduce compressed air into, or to exhaust air out of, the non-designated air chamber, while the tire is rotating; and
   (b) the actuator is further adapted to actuate the tread diameter adjustment means, in response to and in accordance with an actuation signal from the control switch, so as to selectively inflate or deflate either or both of the air chambers as necessary to deploy a selected one or both of the tread sections in operatively-effective contact with the road surface, in accordance with the selected tread configuration.

17. The apparatus of claim 13, wherein:
   (a) the computer further comprises means for transmitting wireless signals;
   (b) the actuator further comprises means for receiving wireless signals; and
   (c) the actuator communication link is a wireless connection.

18. The apparatus of claim 13, wherein:
   (a) at least one of the sensors further comprises means for transmitting wireless signals;
   (b) the computer further comprises means for receiving wireless sensor signals; and
   (c) each sensor communication link associated with a sensor comprising wireless signal transmitting means is a wireless connection.

19. The apparatus of claim 13, wherein the tread diameter adjustment means includes a pneumatic pump in fluid communication with the designated air chamber.

20. The apparatus of claim 17, wherein the pneumatic pump is mounted in association with the wheel rim, and is actuated by power generated by rotation of the pump with the wheel rim.

21. The apparatus of claim 19, wherein the pneumatic pump is battery-powered.

22. The apparatus of claim 13, wherein the tread diameter adjustment means comprises a compressed air storage tank, and with a conduit for delivery of compressed air from the storage tank to the designated air chamber.

23. A variable-diameter tire apparatus for use in association with a motor vehicle, said apparatus comprising:
   (a) a pneumatic tire having:
      a.1 an inboard sidewall and an outboard sidewall, each having a circular outer edge and a circular opening defining an inner edge;
      a.2 a circumferential tread band disposed between and sealingly interconnecting the outer edges of the sidewalls, said tread band having an exterior surface and an interior surface, said exterior surface having a circumferential tread channel dividing the tread band into an inboard tread section and an outboard tread section; and
      a.3 an internal wall generally aligned with the tread channel, and having a circular outer edge sealingly connected to the interior surface of the tread section, and a circular opening defining an inner edge; and
   (b) a wheel rim defining three annular shoulders corresponding to the inner edges of the sidewalls and the internal wall, said wheel rim being mountable on a wheel hub of the vehicle;

said pneumatic tire being coaxially mountable on the wheel rim such that the sidewalls, internal walls, and tread sections define an inboard air chamber and an outboard air chamber, and such that each said inner edge will be urged into sealing contact with a corresponding shoulder upon inflation of the air chambers; and said apparatus further comprising:
   (c) tread diameter adjustment means, adapted to selectively introduce compressed air into, or to exhaust air out of, a designated air chamber selected from said inboard and outboard air chambers, while the tire is rotating;
   (d) an actuator associated with the tread diameter adjustment means;
   (e) a control switch comprising a user interface and a memory; and
   (f) an actuator communication link, for conveying actuation signals from the control switch to the actuator;
   (g) the memory is programmed to store a plurality of tread configurations;
   (h) the user interface may be activated to select one of the tread configurations stored in the memory;
   (i) the control switch is adapted to generate and transmit to the actuator, via the actuator communication link, an actuation signal corresponding to the selected tread configuration; and
   (j) the actuator is adapted to actuate the tread diameter adjustment means, in response to and in accordance with an actuation signal from the control switch, so as to inflate or deflate the designated air chamber as necessary to deploy a selected one of the tread sections, or a selected plurality of the tread sections, in operatively-effective contact with the road surface, in accordance with the selected tread configuration.

24. The apparatus of claim 23, wherein the control switch is installed in the vehicle such that the user interface is readily accessible to the vehicle operator.

25. The apparatus of claim 23, whereinthe tread configurations stored in the control switch memory include the configurations wherein:

(a) only the inboard tread section is in operatively-effective contact with the road surface;

(b) only the outboard tread section is in operatively-effective contact with the road surface; and (c) both tread sections are in operatively-effective contact with the road surface.

26. The apparatus of claim 25, wherein:

(a) the tread diameter adjustment means is further adapted to selectively introduce compressed air into, or to exhaust air out of, the non-designated air chamber, while the tire is rotating; and (b) the actuator is further adapted to actuate the tread diameter adjustment means, in response to and in accordance with an actuation signal from the control switch, so as to selectively inflate or deflate either or both of the air chambers as necessary to deploy a selected one or both of the tread sections in operatively-effective contact with the road surface, in accordance with the selected tread configuration.

27. The apparatus of claim 23, wherein:

(a) the control switch further comprises means for transmitting wireless signals;

(b) the actuator further comprises means for receiving wireless signals; and (c) the actuator communication link wireless connection.

28. The apparatus of claim 23, wherein the tread diameter adjustment means includes a pneumatic pump in fluid communication with the designated air chamber.

29. The apparatus of claim 23, wherein the tread diameter adjustment means comprises a compressed air storage tank, and with a conduit for delivery of compressed air from the storage tank to the designated air chamber.

\* \* \* \* \*